2,744,013

ARTIFICIAL BOARD

Rodger M. Dorland and Paul E. Roberts,
Toronto, Ontario, Canada

No Drawing. Application September 30, 1952,
Serial No. 312,418

Claims priority, application Canada May 9, 1952

8 Claims. (Cl. 92—21)

This invention relates to the manufacture of artificial board from lignocellulosic fibrous material such as wood.

It is well known in the art that hardboard may be produced by the wet process which comprises the steps of comminuting wood into chips, defibrating the chips in the presence of steam and refining the product of the defibrator to provide a pulp, forming the pulp into a sheet, dewatering the pulp and compressing the wet pad at an elevated temperature to form boards of dense material, then subjecting the board to suitable humidification. The resultant artificial board or hardboard comprises a compressed mass of lignocellulosic material bound together by binding constituents of the wood which have been retained during the process. Other processes are also available for making artificial board.

As the use of hardboard has become widespread there has been an increasing demand for a hardboard which is superior to the unmodified board referred to above with respect to its resistance to impact, bending and tensile stresses, abrasion, moisture and the like and yet which includes only a relatively low percentage of modifying agents so that it can be produced at a low cost.

It has previously been proposed to incorporate synthetic resins in the board to give increased water resistance and also to enhance the fiber to fiber bonding thereby improving the physical properties. Phenolic resins are available at a reasonable price and have good process adaptability. Also they impart good water resistance and have a high bonding strength.

It has also been proposed by Boehm in Canadian Patent 345,208, dated October 9, 1934, and others partially or completely to saturate the unmodified hardboard with a drying oil to give increased workability and bendability, and to enhance the physical strength and moisture resistance of the board.

The object of the present invention is to provide a board having overall properties and particularly moisture resistance, which compare favourably with those of hardboard modified with comparable amounts of either resin or drying oil alone.

A further object of this invention is to obtain a board with desirable characteristics using only small amounts of modifying agents such as resin or drying oil, in order that a good quality board may be provided at a low cost.

It has been found in accordance with this invention that a synergistic effect is obtained by the incorporation in the hardboard of small amounts of both a thermosetting resin and a drying agent. The overall physical properties of the board containing both resin and drying agent will be superior, particularly with respect to water resistance, in comparison with properties predictable on the basis of tests of board modified by either resin or drying agent alone in an amount comparable to the total of resin and drying agent contemplated by this invention.

The resin should be a thermosetting resin to impart maximum enhancement of physical properties. Preferably water soluble, acid precipitable phenolic resin is used. The quantity of resin may range from about ½% to 3% by weight of dry weight of fiber. If 2 to 3% of the resin is used a strong, water resistant board will be provided. However, commercial economy may require the use of a lesser quantity such as 1½% which will impart satisfactory strength and water resistance. Good results have been obtained by adding the resin to the defibrated stock in a mixing chest prior to feeding the pulp into the headbox, so as to obtain an intimate mixture of pulp and resin. The resin will be polymerized when the board is consolidated under heat and pressure to give in the case of phenolic resin a C stage resin.

A drying oil such as linseed oil, perilla oil, tung oil or mixtures thereof may be used as the drying agent. The term "drying agent" used in this specification is intended to refer to drying oils such as linseed oil, perilla oil, tung oil or mixtures thereof, and also to include polymerisable oils of petroleum origin. In each case an oily substance is contemplated. A suitable oil mixture is sold under the trade name "Velsicol" and is believed to comprise a mixture of drying oils and also one of the petroleum base oils which acts as a thinner and assists penetration and which also polymerises under the influence of heat. The drying agent may be used in the amount of about 1 to 6% to provide a combined content of resin and oil of about 2 to 8%. For commercial operation 1½% of resin and 4½% of drying agent to give a resin to drying agent ratio of 1 to 3 has proved satisfactory.

The drying agent may be incorporated by impregnating the surfaces of the board while it is still hot from the step of consolidating the board under heat and pressure. In order to permit the escape of moisture during the pressing step and because most uses for the board require only one hard finished surface, it is customary to feed into the press the wet pad mounted on a wire screen. The side of the board which has been directly in contact with the face of the press will be smooth and relatively hard and the side of the board which has been pressed against the screen will bear the imprint of the screen and will be relatively soft. Impregnation of the board by dipping in a bath of drying agent results in the absorption of a large amount of oil by the relatively soft and porous side of the board which has been in contact with the wire screen and in the absorption of only a small amount of oil by the hard surface of the board which has been in direct contact with the press. This procedure requires the use of a fairly large percentage of drying agent to attain sufficient impregnation of the hard surface fully to develop the desirable surface characteristics which the oil is capable of imparting. To attain adequate impregnation of the hard surface of the board without excessive impregnation of the soft surface it is proposed that the drying agent be applied to the board in a selective and controlled manner. The board while still warm from the hardboard press is passed a sheet at a time through the nip of two rubber covered coating rolls. The drying agent is fed to the surface of these rubber coating rolls, prior to contact of the rolls with the hardboard, from walls formed between the coating rolls and other rolls. The rubber coating rolls may be slightly grooved. The selectiveness of oil application can be governed somewhat by the pressure or clearance applied between pairs of stainless steel and rubber coating rolls and to a certain degree by the nip pressure of the coating rolls on the sheets of hardboard. The drying agent may be at room temperature or may be heated up to about 275° F. Preferably the oil is applied to the hard and soft side in the ratio of about 1 to 3. When the sheets of board have been impregnated by the rolls they are conveyed to a bake oven where the board is baked at a temperature varying from 270° to 330° F. for three to six hours.

A forced draft oven is used to give an oxidising atmosphere. The boards are then humidified in chambers kept at a relative humidity such that the boards will pick up approximately 6% of moisture in a three hour period. The boards are then ready for cutting to size, wrapping, and shipping.

Unexpectedly good results were noted during plant operations using about 1½% of resin and 4½% of drying agent. The synergistic effect of the combined use of resin and drying agent was verified by a series of tests which were carried out under conditions carefully controlled to eliminate variables other than the quantities of resin and drying agent. Thus the wax emulsion size normally added in commercial operations in the amount of about 0.5% to 0.75% by weight of wax solids and precipitated with alum was omitted. Also a slightly larger percentage of resin than would be used commercially was employed to develop the comparative effects of the additions. The results of these tests are set forth in Examples 1 and 2.

EXAMPLE 1

The properties of boards containing the following additives was determined:

(1) No resin and no drying agent (blank)
(2) 5% phenolic resin and no drying agent
(3) 5% drying agent and no resin
(4) 2.5% phenolic resin and 2.5% drying agent (All percentages based on the original dry weight of fiber used in each board.) All hardboards were prepared using the same general procedure. In this investigation Velsicol and raw linseed oil (containing 0.04% manganese as a drier) were used as additives.

Hardboard fiber was prepared from unbarked mixtures of hardwoods and softwoods by preliminary steaming of the chips and subsequent refining of the chips on a double-disk Bauer refiner. The resultant fiber was thoroughly blended to insure fiber-uniformity throughout the series.

Pilot-plant scale hardboards were prepared from this fiber in the following manner. Weighed amounts of fiber were slushed and agitated at 0.6% consistency for a total time of 1½ hours. Where resin was to be added the prescribed amounts of phenolic resin were added to the slushed fiber and precipitated after mixing for one hour by a quantity of $H_2SO_4$ sufficient to result in a pH=4.5. After a stirring time of 1½ hours, the fiber slurry was dewatered and formed into a wet-mat by means of a deckle box. The resultant mats were further dewatered by cold-pressing and then hot-pressed between stainless steel platens at a temperature of 380° F. using the same standard press cycle in each case. Where oil was to be added, prescribed amounts of a drying agent were applied by roll-coater to both surfaces of the resultant hot hardboards, the concentrations applied being of the ratio of 3:1 (approx.) for screen and smooth surfaces. All panels were then baked for 3 hours at 295° F. in a forced-draft oven and then sampled for testing such that the resultant properties were comparable and representative. The testing procedure was carried out in accordance with standard methods and involved the following steps:

All samples were conditioned to moisture equilibrium in a controlled atmosphere of 50% relative humidity and 72° F. before testing. For each type of hardboard the following tests were performed and the results reported as an average.

A. 16 samples cut 3" x 6" were selected and tested for the following properties.

(1) Caliper—Five measurements taken on each sample
(2) Specific gravity
(3) Dry modulus of rupture (M. O. R.)—Samples broken at a loading-head speed of 1"/min. on a span of 4"
(4) Modulus of elasticity (M. O. E.)—Calculations based on the average slope of the M. O. R. deflection curve within the proportional limit.

B. 4 samples cut 3" x 6" were selected and tested for the following properties.
(1) Water resistance—samples immersed under a 1" head of water (temp.=72° F.) for 24 hours.
(2) Wet modulus of rupture—samples tested as in dry M. O. R. only after the 24-hour immersion period. The results obtained are summarised in Table 1.

Table 1

| Property | Type Of Hardboard | | | |
|---|---|---|---|---|
| | Blank (1) | 5% resin (2) | 5% oil (3) | 2.5% resin +2.5% oil (4) |
| Caliper (inches) | 0.128 | 0.132 | 0.128 | 0.132 |
| Specific gravity | 0.95 | 0.97 | 0.99 | 0.98 |
| M. O. R. (p. s. i.): | | | | |
| (1) Dry | 4,800 | 8,300 | 7,400 | 8,550 |
| (2) Wet | 1,650 | 3,150 | 2,350 | 4,700 |
| M. O. E. (p. s. i.) | 423,000 | 589,000 | 565,000 | 618,000 |
| Water resistance: | | | | |
| (1) Percent wt. increase | 63 | 37 | 39 | 21 |
| (2) Percent swell | 30 | 18 | 22 | 12 |

It will be apparent from the results summarised in Table 1 that the use of a resin drying agent combination gives a clearly defined synergistic effect. Where resin and oil are used in the proportions indicated in Figure 1 there is given a stronger, more rigid and more water resistant hardboard than the board modified by comparable amounts of either resin or oil alone.

The presence of synergism resulting from the combined use of resin and drying oil was further illustrated by comparing the physical properties of hardboards containing the following additives:

(1) No resin and no oil (blank)
(2) 6% phenolic resin and no oil
(3) 6% drying oil and no resin
(4) 1.5% phenolic resin and 4.5% drying oil
(Note.—All percentages based on original dry weight of fibre used in each board.)

Two separate series of boards were prepared, one series containing only the above additives and a second series containing, in addition 0.7% of a sizing agent. In this investigation, the additives used were Amres 118, raw linseed oil, and the sizing agent was a wax emulsion sold under the trade name "Paracol 600 N."

Hardboard fibre produced commercially and consisting of a mixture of unbarked softwoods and hardwoods was thoroughly blended to insure fibre uniformity throughout the series.

Pilot plant scale hardboard was prepared from this fibre in the following manner. Weighed amounts of fiber were slushed and agitated at 0.6% consistency for a total time of 1½ hours. Where resin and/or Paracol was to be used, prescribed amounts were added to the slushed fibre. In every case the fibre slurry was precipitated after a stirring time of one hour. In the series containing no sizing agent, precipitation was effected by adding a quantity of $H_2SO_4$ sufficient to result in a pH=4.5. In the series containing 0.75% Paracol 600 N, the fibre slurry was precipitated stepwise by first adding 0.25% alum and then adding a quantity of $H_2SO_4$ sufficient to result in a pH=4.5.

After a stirring time of 1½ hours, the fibre slurry was dewatered and formed into wet mats using a deckle box. The resulting mats were further dewatered by cold pressing and then hot pressed between stainless steel platens at a temperature of 380° F. using the same standard press cycle in each case.

Where oil was to be added, prescribed amounts of drying oil containing 0.04% manganese drier were applied by roll-coater to both surfaces of the hardboard preheated at a temperature of 295° F. The concentrations applied were in the approximate ratio of 3:1 for "screen" and "smooth" surfaces.

All panels were baked for 3½ hours at 295° F. in a forced draft oven. The boards were then sampled for testing such that the resultant properties were comparable and representative. Tests were performed in accordance with standard methods.

The results obtained in the series of tests without Paracol are summarised in Table 2, and the results obtained with Paracol are summarised in Table 3.

Table 2
SERIES WITHOUT PARACOL

| Property | Hardboard Type | | | |
|---|---|---|---|---|
| | Blank | 6% Oil | 6% Resin | 4.5% Oil and 1.5% Resin |
| Caliper (inches) | 0.131 | 0.130 | 0.131 | 0.130 |
| Specific gravity | 0.97 | 1.03 | 1.00 | 1.02 |
| M. O. R. (p. s. i.): | | | | |
| (1) Dry | 5,300 | 9,600 | 9,500 | 10,350 |
| (2) Wet | 1,700 | 3,900 | 4,050 | 4,150 |
| M. O. E. (p. s. i.) | 384,000 | 688,000 | 683,000 | 736,000 |
| Water resistance: | | | | |
| (1) Wt. inc., percent | 53 | 21 | 18 | 19 |
| (2) Percent swell | 27 | 13 | 14 | 12 |

Table 3
SERIES WITH PARACOL CONTENT OF 0.75%

| Property | Hardboard Type | | | |
|---|---|---|---|---|
| | Blank | 6% Oil | 6% Resin | 4.5% Oil and 1.5% Resin |
| Caliper (inches) | 0.132 | 0.130 | 0.133 | 0.134 |
| Specific gravity | 0.97 | 1.02 | 1.00 | 1.01 |
| M. O. R. (p. s. i.): | | | | |
| (1) Dry | 4,300 | 9,250 | 9,250 | 9,450 |
| (2) Wet | 1,650 | 3,550 | 4,100 | 4,450 |
| M. O. E. (p. s. i.) | 356,000 | 596,000 | 622,000 | 774,000 |
| Water resistance: | | | | |
| (1) Percent Wt. Inc. | 31 | 19 | 17 | 16 |
| (2) Percent swell | 22 | 13 | 13 | 11 |

The results set forth in Tables 2 and 3 show that the combined use of resin and oil in the amounts of 4.5% oil and 1.5% resin enhance certain important physical properties of the hardboard to a greater extent than comparable amounts of either oil or resin alone. This relationship holds true in the presence of a sizing agent, such as a wax emulsion. The properties with respect to which a synergistic effect is obtained by the combined use of resin and oil include M. O. R. both dry and wet, M. O. E. and water resistance.

We claim:
1. A process for making artificial board which comprises the steps of adding a water soluble, precipitable, phenolic resin to a slushed fibre formed from defibrated wood in the amount of 0.5 to 3% of the dry weight of the fibre, precipitating said resin onto the fibres, de-watering the fibres, consolidating the fibres under heat and pressure to form a substantially rigid hardboard, impregnating both surfaces of said hardboard with a drying oil in the amount of 1 to 6% to permeate only the portion of the hardboard which is adjacent to the surface, the combined amount of resin and drying oil being between 2 and 8% and baking the impregnated board in the presence of oxygen.

2. A process as in claim 1 in which the resin is in the amount of about 1½% and the drying oil is in the amount of about 4½% by weight of dry weight of fibre.

3. An artificial board comprising defibrated wood forming a compressed mass of lignocellulosic material bound together to form a substantially rigid hardboard, a small amount of integrally combined polymerized thermosetting resin uniformly distributed throughout said lignocellulosic material, and a small amount of polymerized drying oil impregnated in the lignocellulosic material at the surfaces only of the board.

4. An artificial board as in claim 3 in which the drying oil is selected from the group consisting of tung oil, linseed oil, perilla oil, and mixtures thereof.

5. An artificial board as in claim 3, in which the combined amount of resin and drying oil is about 2 to 8% by weight of dry weight of fiber and in which the resin and drying oil are present in the proportion of about 1 to 3.

6. An artificial board as in claim 3 in which the resin is about 1½% and the drying oil about 4½% by weight of dry weight of fiber.

7. A process as in claim 1 in which the resin comprises water soluble, acid precipitable phenolic resin.

8. A process as in claim 1 in which the drying oil is selected from the group: tung oil, linseed oil, perilla oil and mixtures thereof.

References Cited in the file of this patent

UNITED STATES PATENTS

| 1,160,362 | Baekeland | Nov. 16, 1915 |
| 1,880,930 | Elbel et al. | Oct. 4, 1932 |
| 1,941,536 | Boehm | Jan. 2, 1934 |
| 2,030,625 | Ellis | Feb. 11, 1936 |
| 2,133,886 | Beegle et al. | Oct. 18, 1938 |
| 2,177,634 | Bradley et al. | Oct. 31, 1939 |
| 2,338,602 | Schur | Jan. 4, 1944 |
| 2,503,267 | Harrison et al. | Apr. 11, 1950 |

FOREIGN PATENTS

| 518,239 | Great Britain | Feb. 21, 1940 |
| 644,298 | Great Britain | Oct. 11, 1950 |